Oct. 3, 1950     L. D. CAHILL     2,524,512
COMPASS SLAVING CIRCUIT
Filed Nov. 23, 1945
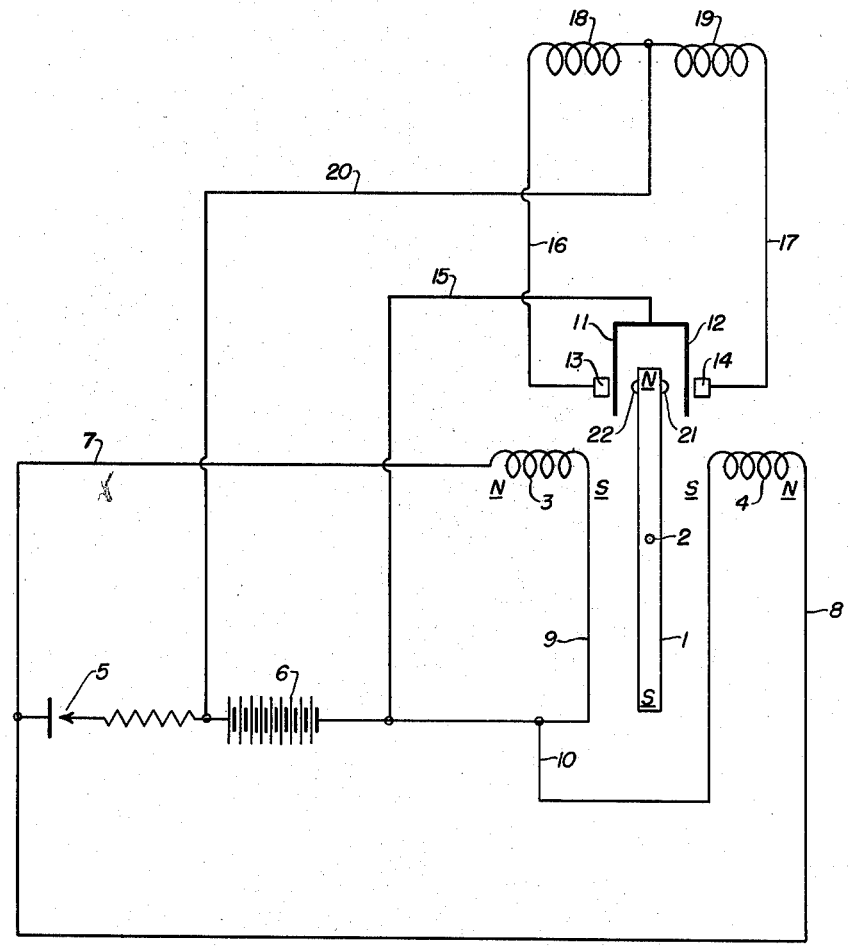
INVENTOR.
LYSLE D. CAHILL
BY
*Fora H Harmon*
ATTORNEY Patented Oct. 3, 1950

2,524,512

UNITED STATES PATENT OFFICE 2,524,512

COMPASS SLAVING CIRCUIT

Lysle D. Cahill, Shaker Heights, Ohio, assignor, by mesne assignments, to Jack & Heintz Precision Industries, Inc., Cleveland, Ohio, a corporation of Delaware Application November 23, 1945, Serial No. 630,409

2 Claims. (Cl. 74—5.46)

This invention relates to a compass slaving system for an aircraft automatic pilot and has for a primary object to provide an automatic system for slaving a directional gyro control in order to maintain a set heading of the aircraft.

A more particular object is to provide a system having a magnetic compass for automatically slaving a directional gyro control of an aircraft automatic pilot in order to maintain a set heading of the aircraft.

Due to the precessional characteristics of gyroscopes it is necessary to periodically adjust directional instruments while in flight to make corrections to a desired magnetic heading. By incorporating a magnetic compass into the slaving system disclosed in this invention, a directional gyro control will after an original setting, automatically maintain an aircraft on a desired magnetic heading without adjustments in flight.

With the foregoing and other objects in view the invention resides in the following specification and appended claims, certain embodiments of which are shown in the attached schematic diagram.

Referring more particularly to the drawing a magnetic compass needle 1 is shown diagrammatically as being freely mounted on pivot 2. The north and south pole of the needle are marked N and S respectively. Equally spaced on either side of north pole N are two magnetic air core coils 3 and 4. The polarity of coils 3 and 4 is such that their south poles are adjacent to the north pole of compass needle 1.

Coils 3 and 4 are intermittently energized by means of a thermal switch 5 which periodically makes and breaks the circuit between a voltage source 6 and the coils. Lines 7 and 8 connect the north pole ends of coils 3 and 4 respectively to the switch 5 on the positive side of the voltage source 6. Lines 9 and 10 connect the south pole ends of coils 3 and 4 to the negative side of voltage source 6.

Two leaf contacts 11 and 12 are shown positioned one on each side of the north pole of the compass needle 1. Positioned adjacent to contacts 11 and 12 are contact members 13 and 14. Leaf contacts 11 and 12 are connected by line 15 to the negative side of power source 6. Contacts 13 and 14 are connected by lines 16 and 17 to two slaving coils 18 and 19 respectively. A common line 20 connects the other ends of the two slaving coils to the positive side of voltage source 6.

The slaving coils which are shown here schematically are normally mounted on the outer gimbal frame of a gyro instrument to supply corrective torques to the gimbal and thereby overcome the precessional tendencies of the gyro rotor. A suitable damping means, not shown, is provided for steadying the compass needle.

For illustrative purposes in explaining the functions of this compass slaving system, assume a case in which an aircraft is flying a due north heading under automatic pilot control. As long as the heading does not vary, the north pole of the compass needle 1 will remain centered between leaf contacts 11 and 12. If the directional gyro should precess slightly, with the result that the heading of the aircraft would vary, then the north pole of the compass needle would no longer be centered. If the aircraft tends to drift west of north, the coil 4, which is fixed with relation to the aircraft, becomes closer to the compass needle than coil 3. As coil 4 is energized by thermal switch 5 its magnetic attraction for the needle becomes much greater than that of coil 3, the south pole of the coil attracting the north pole of the needle. A non-conductive button 21 on the needle engages leaf contact 12 and forces it against contact member 14.

This action closes a circuit through slaving coil 19 which then places a torque on the gyro gimbal to cause a corrective precession of the gyro. This corrective action returns the aircraft to a due north heading.

Conversely, if the aircraft drifts slightly east of north, coil 3 becomes nearer to the needle 1 than coil 4. As coil 3 is energized its south pole attracts the north pole of the needle. A non-conductive button 22 on the needle engages leaf contact 11 forcing it against contact member 13. This action closes a circuit through slaving coil 18 which then places a torque on the gyro gimbal to cause a corrective precession of the gyro. This corrective action returns the aircraft to a due north heading.

In a like manner the compass slaving system will keep an aircraft on any set magnetic heading by controlling the precession of the directional gyro control of the automatic pilot. If it is desired to change the aircraft from one heading to another, such as from north to east, the compass system's housing, not shown, is shifted so as to maintain the coils and contact members properly spaced about the compass needle which always indicates the magnetic north. Thus any tendency of the aircraft to drift north or south of east is corrected by the compass slaving system in a manner identical to the correction applied for drifting of the aircraft east or west of north.

I claim:

1. A compass slaving system for use with gyroscopic assemblies comprising a magnetic compass having a compass needle, an electric power source, a pair of electromagnetic coils normally equally spaced one on each side of said needle, a pair of slaving coils with contact means normally equally spaced one on each side of said needle, a thermal switch in circuit with said electromagnetic coils and said power source and adapted upon movement of said needle toward one or the other of said electromagnetic coils to cause that coil to attract said needle to move the latter to close the corresponding contact means to bring the corresponding slaving coil into circuit with said power source.

2. A compass slaving system for use with gyroscopic assemblies comprising an electric voltage source, a compass needle, a pair of electromagnetic coils normally equally spaced one on each side of said needle, a pair of slaving coils normally having only one side of each in circuit with said voltage source and each having at its other side contact means normally equally spaced one on each side of said needle, switch means for periodically making and breaking the circuit between said electromagnetic coils and said voltage source to energize and de-energize said electromagnetic coils, said switch means upon movement of said needle toward one or the other of said electromagnetic coils being adapted to cause that coil to attract said needle to move the latter to close the corresponding contact means to bring the corresponding slaving coil into closed circuit with said voltage source.

LYSLE D. CAHILL.

REFERENCES CITED

The following references are of record in the file of this patent:

UNITED STATES PATENTS

| Number | Name | Date |
|---|---|---|
| 1,621,335 | Davis | Mar. 22, 1927 |
| 2,126,855 | Wunsch et al. | Aug. 16, 1938 |
| 2,220,055 | Fischel et al. | Oct. 29, 1940 |